US006795866B1

(12) United States Patent
Mankude et al.

(10) Patent No.: US 6,795,866 B1
(45) Date of Patent: Sep. 21, 2004

(54) METHOD AND APPARATUS FOR FORWARDING PACKET FRAGMENTS

(75) Inventors: Hariprasad B. Mankude, Fremont, CA (US); Sohrab F. Modi, Oakland, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 819 days.

(21) Appl. No.: 09/662,560

(22) Filed: Sep. 15, 2000

Related U.S. Application Data

(60) Provisional application No. 60/160,994, filed on Oct. 21, 1999.

(51) Int. Cl.[7] .............................................. G06F 15/173

(52) U.S. Cl. ...................................... 709/238; 709/236

(58) Field of Search ........................ 709/236, 200–253; 370/428, 429, 474

(56) References Cited

U.S. PATENT DOCUMENTS

| 5,396,490 | A | * | 3/1995 | White et al. | 370/474 |
| 6,067,569 | A | * | 5/2000 | Khaki et al. | 709/224 |
| 6,175,874 | B1 | | 1/2001 | Imai et al. | 709/238 |
| 6,320,859 | B1 | * | 11/2001 | Momirov | 370/395.1 |
| 6,483,805 | B1 | * | 11/2002 | Davies et al. | 370/235 |
| 6,549,516 | B1 | * | 4/2003 | Albert et al. | 370/236 |

FOREIGN PATENT DOCUMENTS

| WO | WO 99/39480 | 8/1999 | ............ 12/56 |

* cited by examiner

Primary Examiner—David Wiley
Assistant Examiner—Scott M. Collins
(74) Attorney, Agent, or Firm—Park, Vaughan & Fleming, LLP

(57) ABSTRACT

One embodiment of the present invention provides a system that facilitates forwarding fragments of a packet received from a source node to a destination node, wherein the destination node is determined based upon information within a first fragment of the packet. The system operates by receiving at least one fragment of the packet at an interface node from the source node. The system uses a packet identifier from the fragment to look up an entry for the packet within a packet forwarding data structure. If this entry specifies the destination node, the system forwards the fragment to the destination node. If the entry does not specify the destination node, and if the fragment is not the first fragment of the packet, the system links the fragment into the entry for the packet within the packet forwarding data structure, so that the fragment can be forwarded to the destination node when the destination node later becomes known. In one embodiment of the present invention, if the entry for the packet does not specify the destination node, and if the fragment is the first fragment of the packet, the system: determines the destination node from information contained within the first fragment; initializes the entry for the packet to specify the destination node; and forwards any fragments linked into the entry as well as the first fragment to the destination node.

24 Claims, 5 Drawing Sheets

METHOD AND APPARATUS FOR FORWARDING PACKET FRAGMENTS

RELATED APPLICATION

This application hereby claims priority under 35 U.S.C. § 119 to U.S. Provisional Patent Application No. 60/160,994 filed on Oct. 21, 1999, entitled "Distributed Packet Reassembly for IP" by inventors Hariprasad B. Mankude and Sohrab Modi.

BACKGROUND

1. Field of the Invention

The present invention relates to computer networks and distributed computing systems. More specifically, the present invention relates to a method and an apparatus for forwarding a packet fragment to a destination node, wherein the destination node is determined based upon information within a first fragment of the packet.

2. Related Art

The recent explosive growth of electronic commerce has led to a proliferation of web sites on the Internet selling products as diverse as toys, books and automobiles, and providing services, such as insurance and stock trading. Millions of consumers are presently surfing through web sites in order to gather information, to make purchases, or purely for entertainment.

The increasing traffic on the Internet often places a tremendous load on the servers that host web sites. Some popular web sites receive over a million "hits" per day. In order to process this much traffic without subjecting web surfers to annoying delays in retrieving web pages, it is advantageous to distribute the traffic between multiple server nodes, so that the multiple server nodes can operate in parallel to process the traffic.

In designing such a system to distribute traffic between multiple server nodes, a number of characteristics are desirable. It is desirable for such a system to be efficient in order to accommodate as much traffic as possible with a minimal response time. It is desirable for such a system to be "scalable," so that additional server nodes can be added as demand for a service increases. In doing so, it is important to ensure that response time does not increase.

A system that distributes traffic between multiple server nodes typically performs a number of tasks. Upon receiving a packet containing data from another computer system, the system looks up a service that the packet is directed to. Once the service is determined, the system distributes workload involved in providing the service between the server nodes that are able to provide the service.

For efficiency reasons it is important to ensure that packets originating from the same client are directed to the same server. This requirement is complicated by the fact that a packet is typically divided into a number of fragments for transmission across a network; these fragments are reassembled at the server node to restore the original packet. Unfortunately, the client address (which can be used to identify the client) is typically stored in a header of the packet, which only appears in the first fragment of the packet. Furthermore, the fragments of a packet can be received in any order. Hence, a forwarding mechanism must somehow keep track of how packet fragments are associated with destination nodes.

This can be accomplished by reassembling a packet at the forwarding node to obtain the client address. This allows the forwarding node to determine where to send the packet to. However, forwarding packet fragments in this way can be very inefficient because the packet is likely be divided into fragments again for transmission from the forwarding node to the destination node.

What is needed is a method and an apparatus for forwarding packet fragments to a destination node, wherein the destination node can be determined from a first fragment of a packet.

SUMMARY

One embodiment of the present invention provides a system that facilitates forwarding fragments of a packet received from a source node to a destination node, wherein the destination node is determined based upon information within a first fragment of the packet. The system operates by receiving at least one fragment of the packet at an interface node from the source node. The system uses a packet identifier from the fragment to look up an entry for the packet within a packet forwarding data structure. If this entry specifies the destination node, the system forwards the fragment to the destination node. If the entry does not specify the destination node, and if the fragment is not the first fragment of the packet, the system links the fragment into the entry for the packet within the packet forwarding data structure, so that the fragment can be forwarded to the destination node when the destination node later becomes known.

In one embodiment of the present invention, if the entry for the packet does not specify the destination node, and if the fragment is the first fragment of the packet, the system: determines the destination node from information contained within the first fragment; initializes the entry for the packet to specify the destination node; and forwards any fragments linked into the entry as well as the first fragment to the destination node.

In one embodiment of the present invention, if an entry for the packet does not exist within the packet forwarding data structure, the system creates an entry for the packet. In a variation on this embodiment, creating the entry for the packet involves starting a timer for the entry. When this timer expires, the system removes the entry from the packet forwarding data structure.

In one embodiment of the present invention, if an entry for the packet does not exist within the packet forwarding data structure, and if the fragment is the first fragment of the packet, the system determines the destination node from the information contained within the first fragment; initializes the entry for the packet to specify the destination node; and forwards the first fragment to the destination node.

In one embodiment of the present invention, and if an entry for the packet does not exist within the packet forwarding data structure, and if the fragment is not the first fragment of the packet, the system links the fragment into the entry for the packet within the packet forwarding data structure, so that the fragment can be later forwarded to the destination node when the destination node becomes known.

In one embodiment of the present invention, the packet includes an identifier for an Internet Protocol (IP) packet; and the payload portion of the first fragment of the packet includes a transmission control protocol/user datagram protocol (TCP/UDP) header that is used to determine the destination node.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Clustered Computing System

Figure 1:
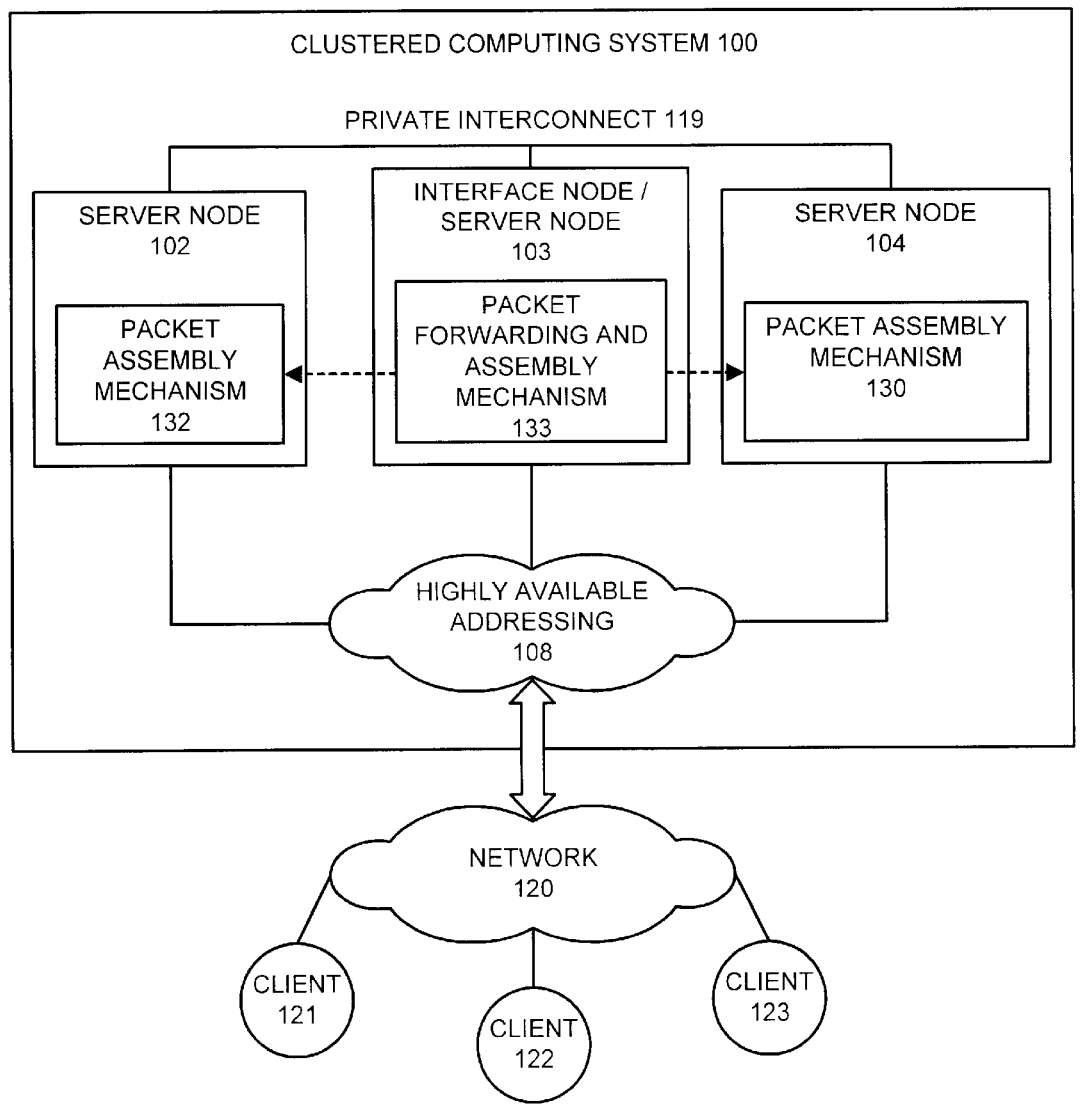
FIG. 1 illustrates a clustered computing system coupled to client computing systems through a network in accordance with an embodiment of the present invention.

FIG. 1 illustrates a clustered computing system 100 coupled to clients 121–123 in accordance with an embodiment of the present invention. Clients 121–123 can include any node on network 120, including computational capability and including a mechanism for communicating across network 120. Clients 121–123 communicate with clustered computing system 100 by sending packets (in fragment form) to clustered computing system 100 in order to request services from clustered computing system 100.

Network 120 can include any type of wire or wireless communication channel capable of coupling together computing nodes. This includes, but is not limited to, a local area network, a wide area network, or a combination of networks. In one embodiment of the present invention, network 120 includes the Internet.

Clustered computing system 100 includes a set of nodes that are coupled together through private interconnect 119. These nodes include server nodes 102 and 104 as well as interface node/server node 103.

Nodes 102–104 are coupled together through private interconnect 119, which can generally include any type of communication mechanism. In one embodiment of the present invention, private interconnect 119 adheres to the Ethernet standard. In another embodiment, private interconnect 119 adheres to the scalable coherent interconnect (SCI) standard.

Note that interface node 103 can host one or more shared IP addresses for clustered computing system 100. Also note, than more that one node in clustered computing system 100 can act as an interface node for a given service. This allows a backup interface node to take over for an interface node that fails. Note that nodes 102–104 within clustered computing system 100 can provide scalable services. Each scalable service behaves as a single logical entity from the view of clients 121–123. Also note that clients 121–123 can communicate with clustered computing system 100 through a transmission control protocol (TCP) connection or a user datagram protocol (UDP) session.

Clustered computing system 100 operates generally as follows. As packets arrive at interface node 103 from clients 121–123, a service is selected for the packet based on the destination address in the packet. Next, a service instance is selected for the packet based upon the source address of the packet as well as the destination address of the packet. Note that the system ensures that packets belonging to the same TCP connection or UDP instance are sent to the same service instance. Finally, the packet is sent to the selected service instance.

Also note that server nodes 102–104 include mechanisms for forwarding and assembling packet fragments into packets. More specifically, server node 104 includes packet assembly mechanism 130, server node 102 includes packet assembly mechanism 132, and server node 103 includes packet forwarding and assembly mechanism 133.

During operation, packet forwarding and assembly mechanism 133 receives fragments of packets from clients 121–123 and forwards the packet fragments to server instances 201–203 based on the destination addresses of the packets. This process is described in more detail below with reference to FIGS. 3–5.

Also note that although the present invention is described in the context of a specific clustered computer system architecture, the present invention can generally be applied to any computer system in which packet fragments are forwarded to other computers systems based upon information contained within the packet fragments.

Internal Structure of Interface Nodes and Server Nodes

Figure 2:
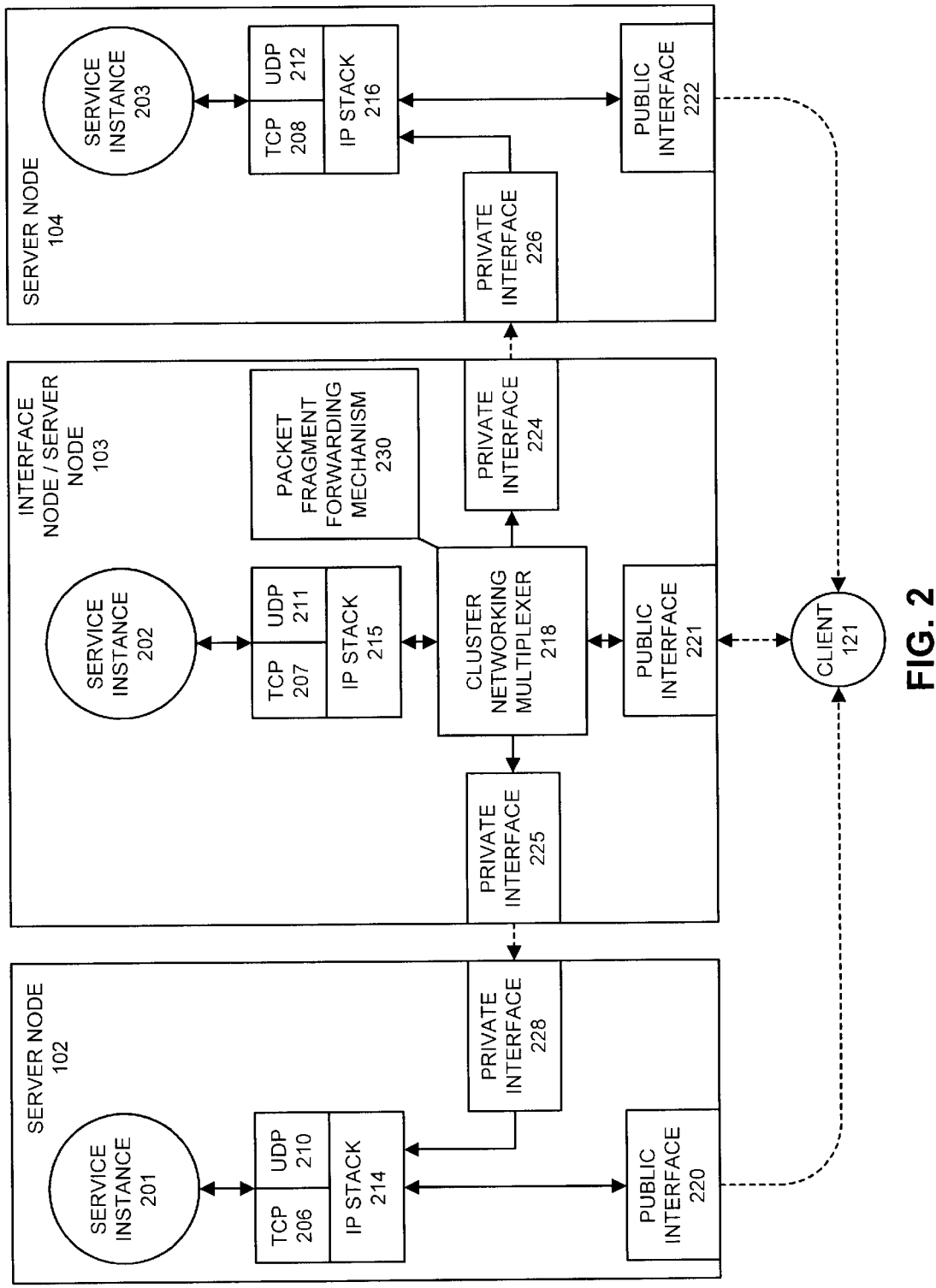
FIG. 2 illustrates the internal structure of an interface node and two server nodes within a clustered computing system in accordance with an embodiment of the present invention.

FIG. 2 illustrates the internal structure of interface node 103 and server nodes 102 and 104 within clustered computing system 100 in accordance with an embodiment of the present invention. Client 121 sends packets to clustered computing system 100 in order to receive a service from clustered computing system 100. These packets enter public interface 221 within interface node 103 in clustered computing system 100. Public interface 221 can include any type of interface that is able to receive packets from network 120.

As packets arrive at interface node 103 via public interface 221, they pass through cluster networking multiplexer 218. Cluster networking multiplexer 218 forwards the packets to various nodes within clustered computing system 100 based upon load balancing policies and other considerations.

Packets are forwarded from interface node 103 to other nodes in the clustered computing system 100, including server nodes 102 and 104, through private interfaces 224 and 225. Private interfaces 224 and 225 can include any interface that can handle communications between nodes within clustered computing system 100. For example, packets can be forwarded from private interface 224 to private interface 226 on server node 104, or from private interface 225 to private interface 228 on server node 102. Note that private interfaces 224 and 225 do not handle communications with entities outside of clustered computing system 100.

In some embodiments of the present invention, private interface 224 (and 225) and public interface 221 share some of the same communication hardware and send messages down some of the same physical data paths. In some of these embodiments, private interface 224 and public interface 221 may also share some of the same interface software. Hence, private interface 224 and public interface 221 need not represent different communication mechanisms. Therefore, the distinction between private interface 224 and public interface 221 can be merely a distinction between whether the communications are with an entity outside of clustered computing system 100, or with an entity within clustered computing system 100.

Packets entering server nodes 102 and 104 pass through IP stacks 214 and 216, respectively. Cluster networking multiplexer 218 can also send packets to IP stack 215 within interface node/server node 103, because node 103 is also able to act as a server. On server node 102, packets pass through IP stack 214 into TCP module 206, which supports TCP connections, or into UDP module 210, which supports UDP sessions. Similarly, on interface node/server node 103, packets pass through IP stack 215 into TCP module 207, or into UDP module 211. On server node 104, packets pass through IP stack 216 into TCP module 208, or into UDP module 212. Next, the packets are processed by service instances 201–203 on nodes 102–104, respectively.

Note that return communications for server nodes 102 and 104 do not follow the same path. Return communication from server node 102 pass down through IP stack 214, through public interface 220 and then to client 121. Similarly, return communications from server node 104 pass down through IP stack 216, through public interface 222 and then to client 121. This frees interface node 103 from having to handle return communication traffic.

For web server applications (and some other applications), this return communication mechanism can provide load balancing for the return traffic. Note that web servers typically receive navigational commands from a client, and in response send large volumes of web page content (such as graphical images) back to the client. For these applications, it is advantageous to distribute the return traffic over multiple return pathways to handle the large volume of return traffic.

Note that cluster networking multiplexer 218 is coupled to packet forwarding mechanism 230, which forwards packet fragments to server instances 201–203 as is described in more detail below with reference to FIGS. 3–5.

Packet Fragment Structure

Figure 3:
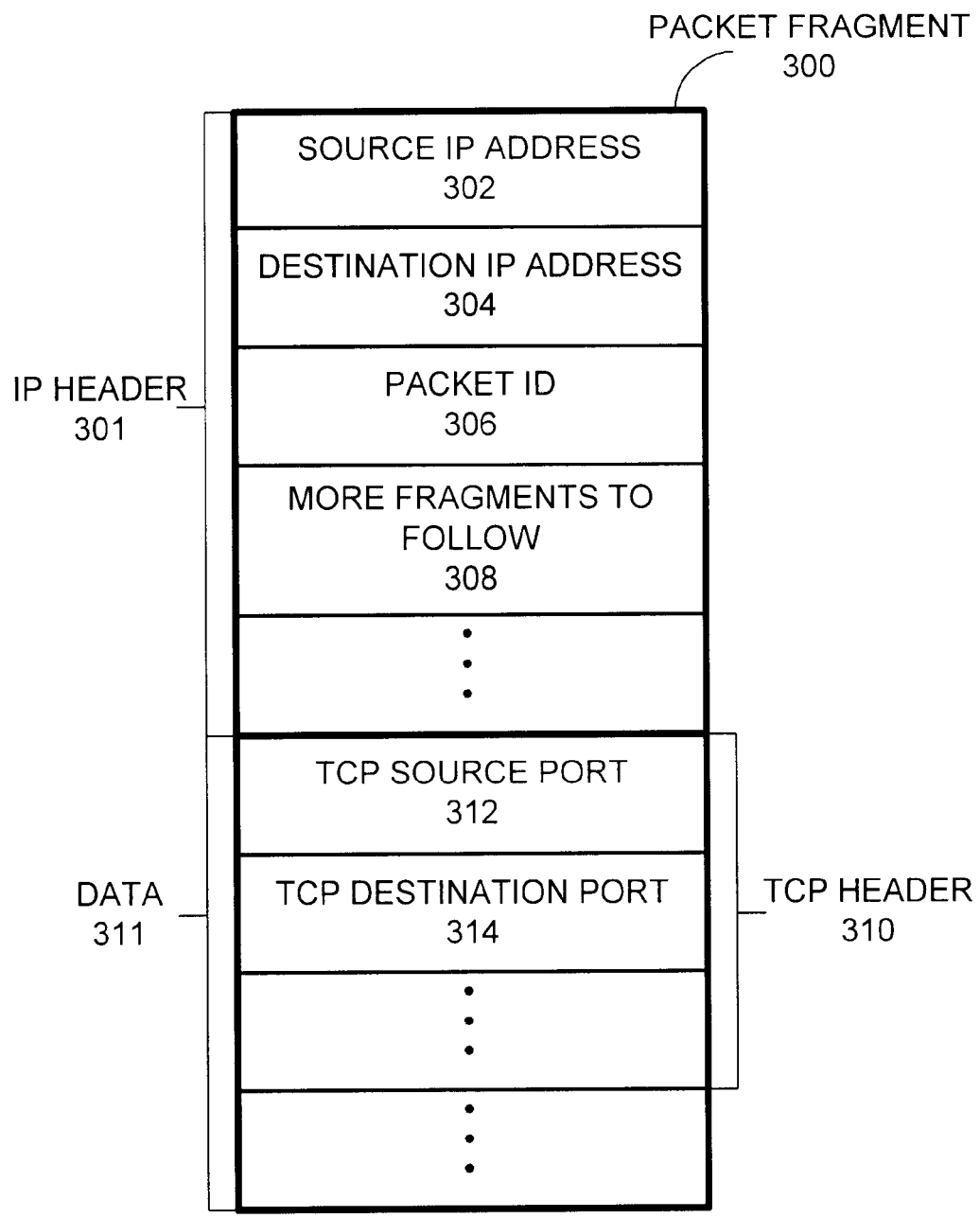
FIG. 3 illustrates the structure of a packet fragment in accordance with an embodiment of the present invention.

FIG. 3 illustrates the structure of a packet fragment 300 in accordance with an embodiment of the present invention. Packet fragment 300 is produced during transmission of a packet from one of clients 121–123 to interface node 103. When the internet protocol (IP) layer receives a packet to be sent, it compares the size of the packet with a maximum transfer unit (MTU) of the interface on which the packet is going to be sent. If the size of the packet is greater than the MTU of the interface, the packet is fragmented. This fragmentation can occur at intermediate routers, and the same packet can be fragmented multiple times depending upon the MTU of the interfaces the packet is routed through.

Each IP packet header includes an identification field. The sender of the packet places a unique value in this identification field, and this unique value is copied into each fragment of the patent packet. For example, in FIG. 3, the IP header 301 of packet fragment 300 includes packet ID 306, which identifies the packet to which packet fragment 300 belongs.

IP header 301 also includes the source IP address of the client that sent the packet, and the destination IP address of the service to which the packet is directed within clustered computing system 100. IP header 301 also includes a packet flag 308 indicating whether more fragments are to follow in the packet. If packet fragment 300 is the last fragment in a packet, flag 308 is set to a false value.

Packet fragment 300 also includes a data (payload) portion that stores portions of the packet to be reassembled at the server instance. The first fragment of a packet includes a TCP header 310 that specifies a TCP source port 312 and a TCP destination port 314. In order to forward packets from a client to the same server instance, the destination node is determined by performing a lookup based upon TCP source port 312. Note that this lookup can additionally be based source IP address 302, destination IP address 304 and a protocol specifier.

Also note that other fragments besides the first fragment do not include TCP header 310, and consequently do not contain information that can be used to determine the destination. Packets can also arrive asynchronously and out of order.

Packet Forwarding Data Structure

Figure 4:
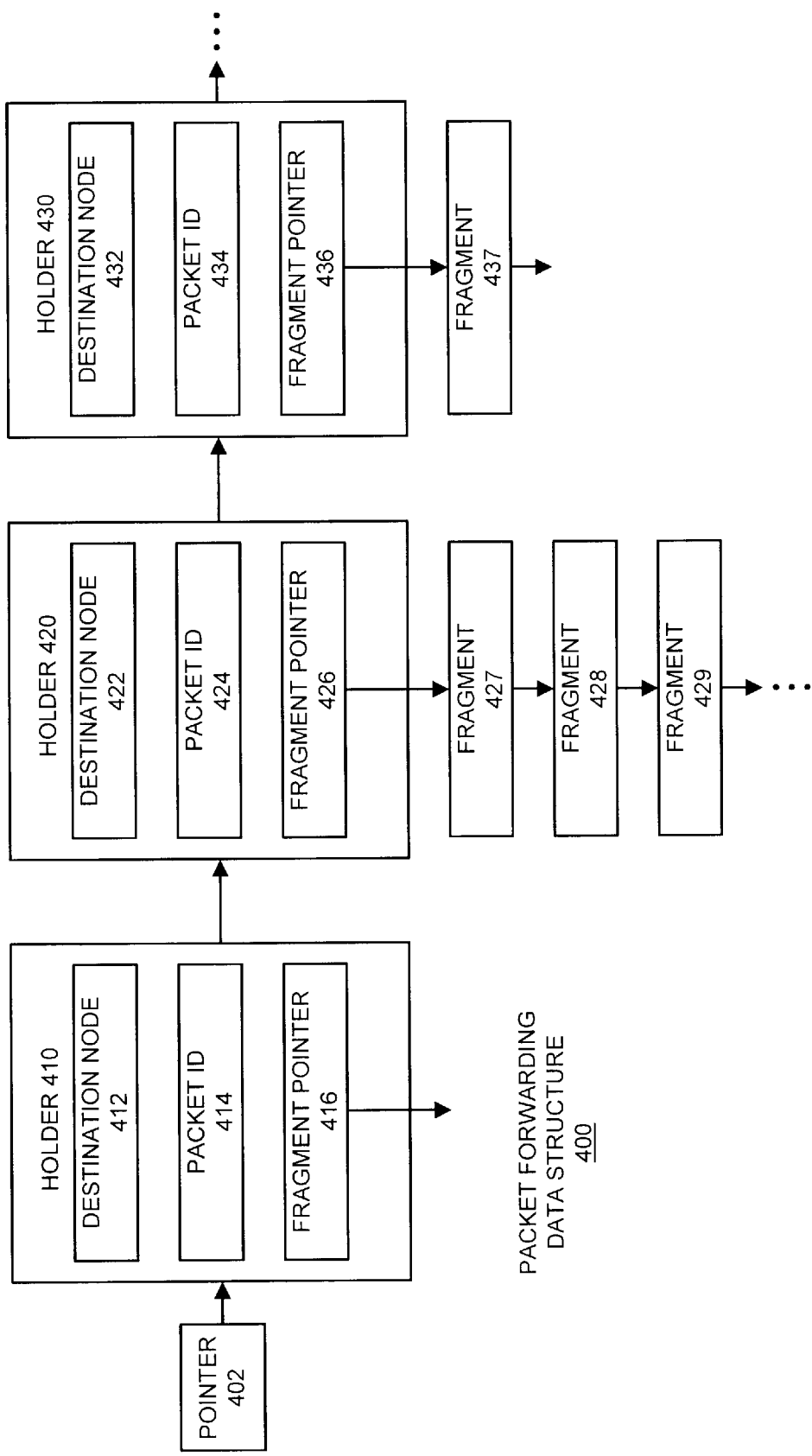
FIG. 4 illustrates a packet forwarding data structure in accordance with an embodiment of the present invention.

FIG. 4 illustrates a packet forwarding data structure 400 in accordance with an embodiment of the present invention. Packet forwarding data structure 400 is referenced through pointer (or handle) 402, which points to a linked list (or some other lookup structure) containing holder objects 410, 420 and 430. Note that a separate holder object is created for each packet that is in the process of being forwarded to a server instance an a destination node.

Holder object 410 includes a number of fields, including destination node 412, which contains an address of the destination to which the packet is being forwarded. Note that destination node 412 can only be filled in after the first fragment of a packet is received. Holder object 410 also includes a packet ID 414, which uniquely identifies the packet. (Note that holder object 410 may also include a source IP address, a destination IP address and a protocol specifier.)

Holder object 410 also includes a fragment pointer 416, which points to a linked list of packet fragments (or pointers to packet fragments) that have not been forwarded to the destination node. Note that packet fragments can queue up in holder object 410 if they are received before the first packet fragment is received. Upon receiving the first packet and determining the destination node, the system forwards the queued packet fragments to the destination node.

Similarly, holder object 420 includes destination node 422, packet ID 424 and fragment pointer 426. Fragment pointer 426 points to a linked list containing packet fragments 427–429.

Similarly, holder object 430 includes destination node 432, packet ID 434 and fragment pointer 436. Fragment pointer 436 points to a linked list containing packet fragment 437.

Although FIG. 4 illustrates a specific structure for packet forwarding data structure 400, the present invention is not meant to be limited to the structure shown. In general, any structure that that can store holder objects and fragments can be used to implement packet forwarding data structure 400.

Process of Forwarding a Packet Fragment

Figure 5:
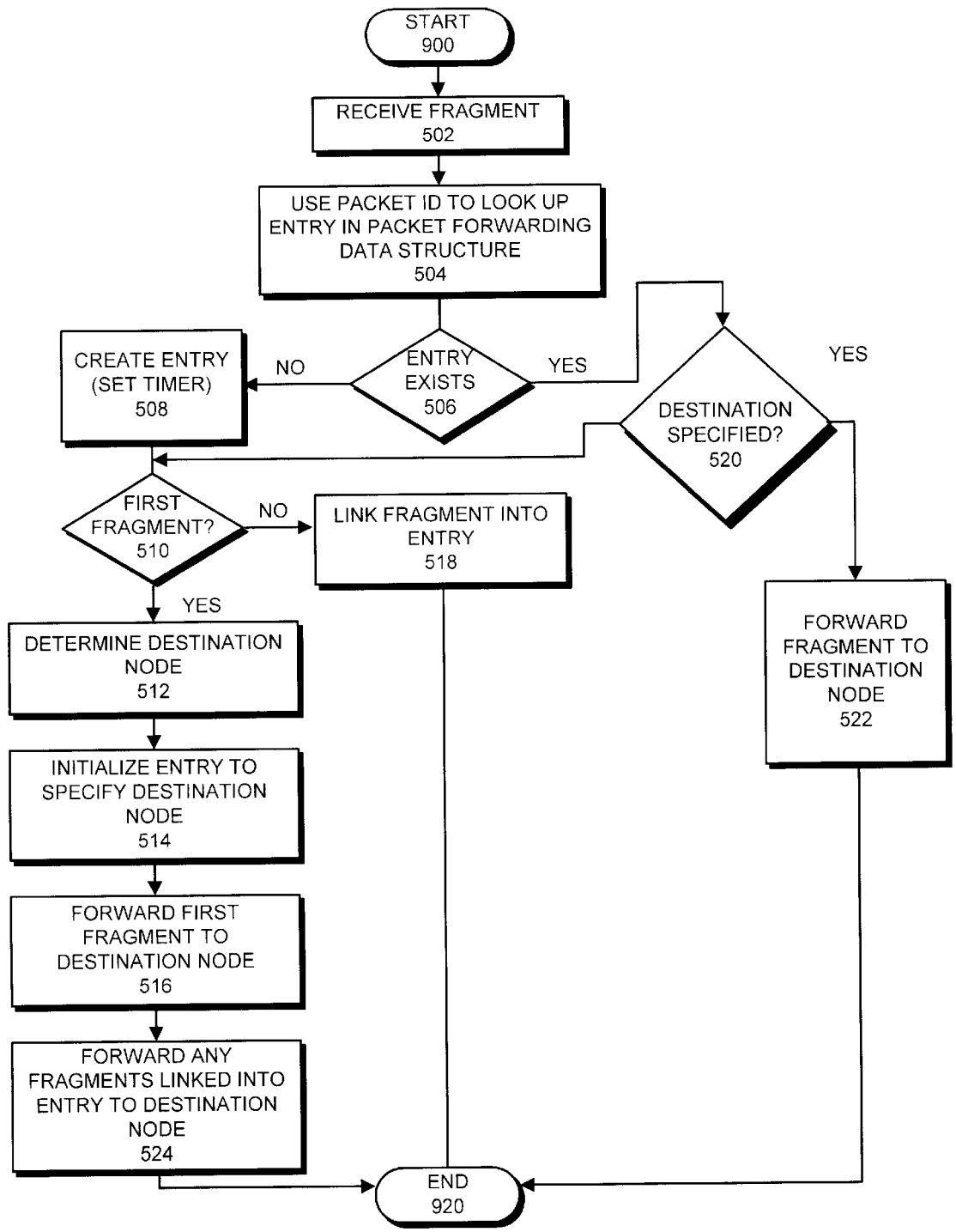
FIG. 5 is a flow chart illustrating the process of forwarding a packet fragment in accordance with an embodiment of the present invention.

FIG. 5 is a flow chart illustrating the process of forwarding a packet fragment in accordance with an embodiment of the present invention. This flow chart illustrates the actions of packet fragment forwarding mechanism 230 within interface node 103, which is illustrated in FIG. 2.

The system starts by receiving a packet fragment 300 (step 502). The system uses packet ID field 306 from packet fragment 300 (and possibly source IP address 302, destination IP address 304 and a protocol specifier) to lookup an entry (holder object) within packet forwarding data structure 400 (step 504). This allows the system to determine if an entry exists for packet fragment 300 (step 506).

If an entry does not exist for packet fragment 300 within packet forwarding data structure 400, the system creates a holder object and inserts the holder object into packet forwarding data structure 400 (step 508). The system also initializes a timer associated with the holder object. When this timer expires, the holder object is removed from packet forwarding data structure 400. Next, the system determines if the fragment is a first fragment of the packet, which contains the TCP header (step 510).

If not, the system links the fragment into the holder object associated with the packet so that the fragment can be sent to the destination node at a later time, when the destination node becomes known (step 518).

If the fragment is the first fragment, the system uses the TCP source address to determine the destination node for the packet. This ensures that all packets from the same client will be routed to the same destination node (step 512). Next, the system initializes the destination node field within the holder object to specify the destination (step 514).

The system then forwards the first fragment to the destination node (step 516). If any additional fragments are linked into the holder object, the system forwards these additional fragments as well (step 524).

At step 506, if a holder object for the packet does exist within packet forwarding data structure 400, the system determines whether a destination node is specified within the holder object (step 520). If so, the system simply forwards the packet fragment to the destination node. If the destination node is not specified within the holder object, the system proceeds to step 510 to carry out the process described above in steps 510, 512, 514, 516 518 and 524.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for forwarding fragments of a packet received from a source node to a destination node, wherein the destination node is determined based upon information within a first fragment of the packet, comprising:
    receiving a fragment of the packet at an interface node from the source node, wherein the fragment includes a packet identifier for the packet;
    using the packet identifier to look up an entry for the packet within a packet forwarding data structure; and
    if the entry specifies the destination node, forwarding the fragment to the destination node;
    wherein the forwarding takes place without having to reassemble the packet; and
    wherein a service is selected for the packet based on the destination address in the packet and a service instance is selected based upon a source address of the packet;
    whereby the system ensures that packets belonging to the same protocol connection are sent to the same service instance.

2. The method of claim 1, wherein if the entry does not specify the destination node, and if the fragment is not the first fragment of the packet, then the method further comprises linking the fragment into the entry for the packet within the packet forwarding data structure, so that the fragment can be forwarded to the destination node when the destination node later becomes known.

3. The method of claim 1, wherein if the entry for the packet does not specify the destination node, and if the fragment is the first fragment of the packet, then the method further comprises:
    determining the destination node from information contained within the first fragment;
    initializing the entry for the packet to specify the destination node; and
    forwarding fragments linked into the entry as well as the first fragment to the destination node.

4. The method of claim 1, wherein if an entry for the packet does not exist within the packet forwarding data structure, the method further comprises creating an entry for the packet within the packet forwarding data structure.

5. The method of claim 4, wherein creating the entry for the packet within the packet forwarding data structure involves starting a timer for the entry, and further comprising removing the entry from the packet forwarding data structure when the timer expires.

6. The method of claim 4, wherein if the fragment is the first fragment of the packet, then the method further comprises:
    determining the destination node from the information contained within the first fragment;
    initializing the entry for the packet to specify the destination node; and
    forwarding the first fragment to the destination node.

7. The method of claim 4, wherein if the fragment is not the first fragment of the packet, then the method further comprises linking the fragment into the entry for the packet within the packet forwarding data structure, so that the fragment can be later forwarded to the destination node when the destination node becomes known.

8. The method of claim 1,
    wherein the packet includes an identifier for an Internet Protocol (IP) packet; and
    wherein the payload portion of the first fragment of the packet includes a transmission control protocol/user datagram protocol (TCP/UDP) header that is used to determine the destination node.

9. A computer-readable storage medium storing instructions that when executed by a computer cause the computer to perform a method for forwarding fragments of a packet received from a source node to a destination node, wherein the destination node is determined based upon information within a first fragment of the packet, the method comprising:
    receiving a fragment of the packet at an interface node from the source node, wherein the fragment includes a packet identifier for the packet;
    using the packet identifier to look up an entry for the packet within a packet forwarding data structure; and
    if the entry specifies the destination node, forwarding the fragment to the destination node;
    wherein the forwarding takes place without having to reassemble the packet; and
    wherein a service is selected for the packet based on the destination address in the packet and a service instance is selected based upon a source address of the packet;
    whereby the system ensures that packets belonging to the same protocol connection are sent to the same service instance.

10. The computer-readable storage medium of claim 9, wherein if the entry does not specify the destination node, and if the fragment is not the first fragment of the packet, then the method further comprises linking the fragment into the entry for the packet within the packet forwarding data structure, so that the fragment can be forwarded to the destination node when the destination node later becomes known.

11. The computer-readable storage medium of claim 9, wherein if the entry for the packet does not specify the destination node, and if the fragment is the first fragment of the packet, then the method further comprises:

determining the destination node from information contained within the first fragment;

initializing the entry for the packet to specify the destination node; and forwarding fragments linked into the entry as well as the first fragment to the destination node.

12. The computer-readable storage medium of claim 9, wherein if an entry for the packet does not exist within the packet forwarding data structure, the method further comprises creating an entry for the packet within the packet forwarding data structure.

13. The computer-readable storage medium of claim 12, wherein creating the entry for the packet within the packet forwarding data structure involves starting a timer for the entry, and wherein the method further comprises removing the entry from the packet forwarding data structure when the timer expires.

14. The computer-readable storage medium of claim 12, wherein if the fragment is the first fragment of the packet, then the method further comprises:

determining the destination node from the information contained within the first fragment;

initializing the entry for the packet to specify the destination node; and forwarding the first fragment to the destination node.

15. The computer-readable storage medium of claim 12, wherein if the fragment is not the first fragment of the packet, then the method further comprises linking the fragment into the entry for the packet within the packet forwarding data structure, so that the fragment can be later forwarded to the destination node when the destination node becomes known.

16. The computer-readable storage medium of claim 9, wherein the packet includes an identifier for an Internet Protocol (IP) packet; and wherein the payload portion of the first fragment of the packet includes a transmission control protocol/user datagram protocol (TCP/UDP) header that is used to determine the destination node.

17. An apparatus that facilitates forwarding fragments of a packet received from a source node to a destination node, wherein the destination node is determined based upon information within a first fragment of the packet, the apparatus comprising:

a receiving mechanism within an interface node that is configured to receive a fragment of the packet from the source node, wherein the fragment includes a packet identifier for the packet;

a lookup mechanism that is configured to use the packet identifier to look up an entry for the packet within a packet forwarding data structure; and a forwarding mechanism that is configured to forward the fragment to the destination node if the entry specifies the destination node;

wherein the forwarding mechanism that is configured to forward the fragment without waiting to reassemble the packet; and wherein a service is selected for the packet based on the destination address in the packet and a service instance is selected based upon a source address of the packet;

whereby the system ensures that packets belonging to the same protocol connection are sent to the same service instance.

18. The apparatus of claim 17, wherein if the entry does not specify the destination node, and if the fragment is not the first fragment of the packet, then the forwarding mechanism is configured to link the fragment into the entry for the packet within the packet forwarding data structure, so that the fragment can be forwarded to the destination node when the destination node later becomes known.

19. The apparatus of claim 17, wherein if the entry for the packet does not specify the destination node, and if the fragment is the first fragment of the packet, then the forwarding mechanism is further configured to:

determine the destination node from information contained within the first fragment;

initialize the entry for the packet to specify the destination node; and to forward fragments linked into the entry as well as the first fragment to the destination node.

20. The apparatus of claim 17, wherein if an entry for the packet does not exist within the packet forwarding data structure, the forwarding mechanism is further configured to create an entry for the packet within the packet forwarding data structure.

21. The apparatus of claim 20, wherein in creating the entry for the packet within the packet forwarding data structure, the forwarding mechanism is further configured to start a timer for the entry, and further comprising a removing mechanism that is configured to remove the entry from the packet forwarding data structure when the timer expires.

22. The apparatus of claim 20, wherein if the fragment is the first fragment of the packet, then the forwarding mechanism is further configured to:

determine the destination node from the information contained within the first fragment;

initialize the entry for the packet to specify the destination node; and to forward the first fragment to the destination node.

23. The apparatus of claim 20, wherein if the fragment is not the first fragment of the packet, then the forwarding mechanism is further configured to link the fragment into the entry for the packet within the packet forwarding data structure, so that the fragment can be later forwarded to the destination node when the destination node becomes known.

24. The apparatus of claim 17, wherein the packet includes an identifier for an Internet Protocol (IP) packet; and wherein the payload portion of the first fragment of the packet includes a transmission control protocol/user datagram protocol (TCP/UDP) header that is used to determine the destination node.

* * * * *